Patented Mar. 17, 1925.

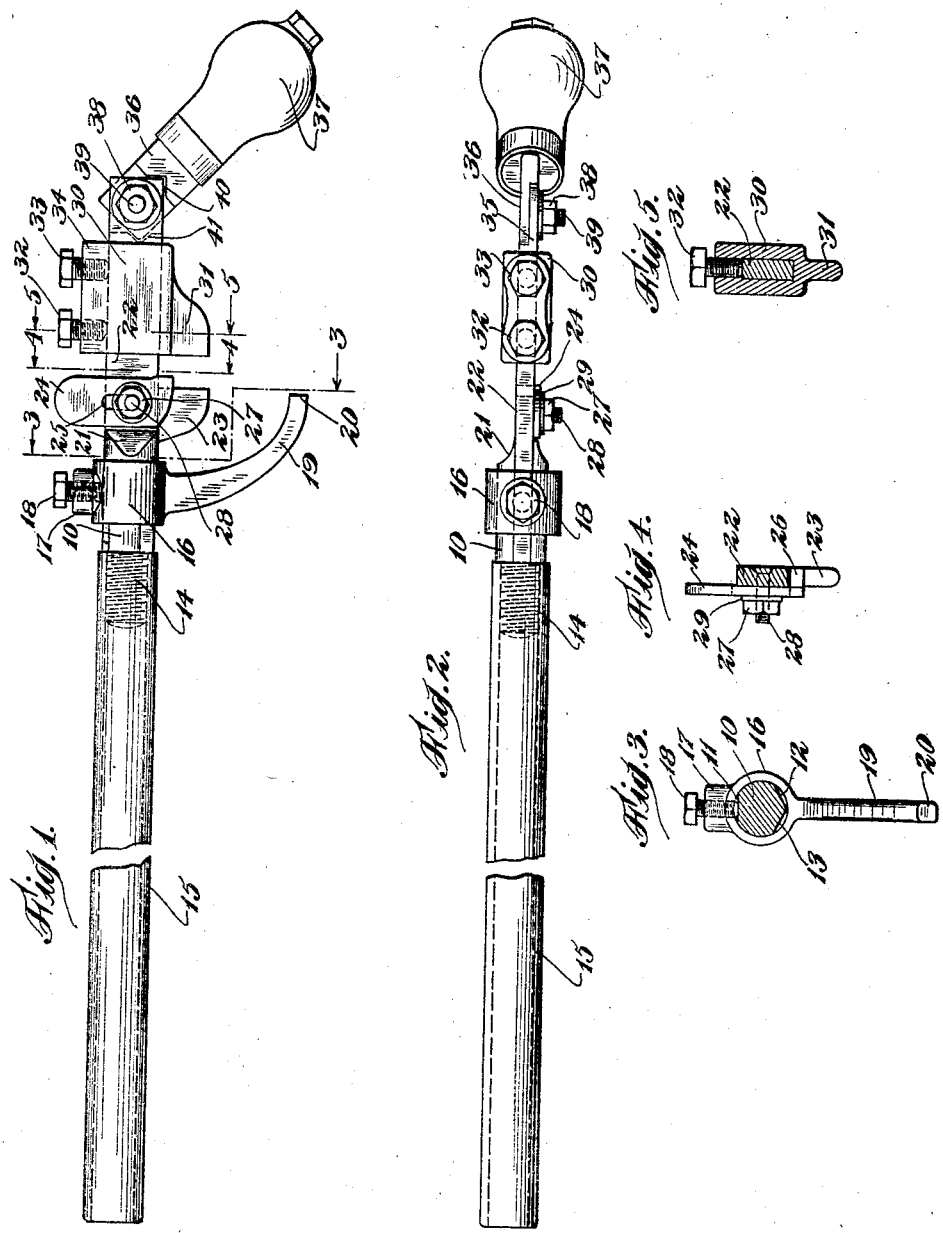

1,530,456

UNITED STATES PATENT OFFICE.

DOMINIK ALESKUS, OF CLOQUET, MINNESOTA.

SAW-SETTING APPARATUS.

Application filed December 26, 1922. Serial No. 608,968.

*To all whom it may concern:*

Be it known that I, DOMINIK ALESKUS, a citizen of Lithuania, residing at Cloquet, county of Carlton, and State of Minnesota, have invented certain new and useful Improvements in a Saw-Setting Apparatus, of which the following is a specification.

This invention relates to improvements in saw setting apparatus, and it is the principal object of the invention to provide a device of this character permitting a regulation for setting teeth of varying length and width.

Another object of the invention is the provision of an instrument of this character possessing a forceful leverage and equipped with means for locking the parts in their adjusted positions.

A further object of the invention is the provision of a device of this type, equipped with an adjustable handle.

Other objects and advantages of my invention will become more fully apparent as the description thereof proceeds, and will then specifically be pointed out in the appended claims.

In the accompanying drawing forming a material part of this disclosure:

Figure 1 is a side view of the saw setting device constructed according to the present invention, Fig. 2 is a top edge view of the same, Fig. 3 is a detail view in section on line 3—3 of Fig. 1, Fig. 4 is a detail view in section on line 4—4 of Fig. 1, and Fig. 5 is a detail view in section on line 5—5 of Fig. 1.

My device as illustrated in the drawing comprises a stem 10, having a flattened top part 11, rounded side faces and flattended bottom parts 12 and 13.

The front end of stem 10 is threaded as indicated at 14 for the attachment of a comparatively long hollow handle 15 provided at one end with interior thread to engage thread 14 of the stem.

A sleeve 16 having its inner wall shaped to snugly fit against the outer face of the stem and adapted to slide therein, carries on top a projecting collar 17 provided with inner screw thread for the reception of the threaded end of a nut bolt 18 allowing a locking of the sleeve 16 on stem 10.

The lower end of sleeve 16 has integrally made therewith a horn to engage with its lower end 20 the side face of a saw, the teeth of which are to be set. The rear end of stem 10 is bevelled as at 21, and flattened as at 22 and has integrally formed therewith contiguous to bevelled part 21, a cheek or guide 23.

A regulating plate 24 provided with a longitudinal slot 25 in its face and a lower shoulder 26 engages the flattended part 22 and is guided along cheek 23 and can be locked in its adjusted position by means of a nut 27 on a bolt 28 secured in part 22, and having a threaded upper end. A washer 29 is interposed between nut 27 and plate 24, while finger or shoulder 26 glides along the outer end face of guide 23 and in the highest position of plate 24 engages the lower edge of part 22 with its upper edge, thus limiting the upward movement of plate 24.

Upon flattened part 22 slides an angular sleeve 30 having a lower cheek 31 adapted to co-operate with cheek 23.

The sleeve 30 can be locked in its adjusted position on part 22 of stem 10 by means of nut bolts 32 and 33 entering an upper projection 34 of sleeve 30 and engaging the upper edge of stem 10.

The extreme outer end of the flattened part 22 of stem 10 is set off as at 35, and is engaged by the stem 36 of a handle 37 which is set off in a similar manner and locked to set off part 35 by means of a nut 38 on bolt 39 on stem 36.

The shoulders formed by the set off parts 36 of handle and 35 of stem 10, are provided with triangularly shaped notches 40 and 41 to accommodate the end edges of parts 10 and 36 respectively when the handle 37 is locked in inclined position to stem 10 as indicated in Figure 1.

The device operates as follows:

A saw, the teeth of which are to be set, is placed with its side face against guide 23 and plate 24 is raised or lowered in proportion with the depth of the teeth and then locked in its position by means of the nut 27.

When the sleeve 30 by the proper manipulation of nut bolts 32 and 33 is brought into the proper position and locked therein, its cheek 31 will engage the saw teeth with the opposite side of said teeth.

When now the handle 15 is supported on a bench or other support and the handle 37 is properly manipulated, it will be possible to set the teeth at any desired angle.

The force exerted on handle 37 may be increased by locking the same in inclined position to stem 10 as illustrated in Figure 1.

Changes may apparently be made in the general arrangement and the construction of the minor details of my invention without departing from the scope and spirit thereof.

What I claim as new and desire to secure by Letters Patent is:

1. A saw-setting device, comprising a stem, a cheek formed on the stem, a depth guide slidably mounted on and transversely of the stem and guided in movement by said cheek; means for fixing the guide relative to the cheek a second cheek longitudinally slidable on the stem; means whereby the second cheek may be fixed with relation to the stem, and means for operating the device.

2. A saw-setting device, comprising a stem, a cheek formed on the stem, a depth guide slidably mounted on the stem and guided in movement by said cheek, a second cheek slidable on the stem, means whereby the second cheek may be fixed with relation to the stem, and means slidable on the stem to engage the side of the saw to position said saw relative to said cheeks.

3. A saw-setting device comprising a stem having a threaded front and a flattened rear end; a sleeve shaped to fit on said stem; a means for securing said sleeve on said stem, and a lower horn on said sleeve for engaging and guiding a saw; two saw-teeth-setting cheeks, one stationary on said stem and the other movable thereon, means for locking the movable cheek, and a guide plate adapted to slide vertically along said stationary cheek for allowing an adjustment of the cheeks in harmony with the depth of the saw teeth, means for locking said plate, and means for operating the device.

4. A saw-setting device comprising a stem having a threaded front end, a comparatively long tubular handle adapted to be attached to said front end, said stem having a flattened upper edge and substantially flat faces on its lower edge, rounded side faces, and a flattened end part, a cheek formed integral with said stem near the beveled ends of said rounded side faces, a plate having a longitudinal slot and a lower finger, a screw bolt and nut for locking said plate in its adjusted position on said cheek, a multicornered sleeve slidably provided on the flattened end of said stem, means engaged with said sleeve for locking the same to said stem, a cheek integral with the lower end of said sleeve and cooperating with said first-named cheek to set the teeth of a saw, means engaging said flattened parts and adapted to be locked thereto for guiding a saw blade, a handle pivotally secured to said stem, the extreme outer end of said stem offset and adapted to be engaged by the offset part of said handle, and means for locking said handle in its inclined position to said stem.

In testimony whereof I have affixed my signature.

DOMINIK ALESKUS.